US012078189B2

(12) United States Patent
Nichols et al.

(10) Patent No.: US 12,078,189 B2
(45) Date of Patent: Sep. 3, 2024

(54) VARIABLE VANE AIRFOIL WITH RECESS TO ACCOMMODATE PROTUBERANCE

(71) Applicant: Pratt & Whitney Canada Corp., Longueuil (CA)

(72) Inventors: Jason Nichols, Mississauga (CA); David Batch, Mississauga (CA); Daniel Poick, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/884,167

(22) Filed: Aug. 9, 2022

(65) Prior Publication Data

US 2024/0052852 A1 Feb. 15, 2024

(51) Int. Cl.

*F04D 29/56* (2006.01)
*F01D 5/14* (2006.01)
*F01D 9/04* (2006.01)
*F01D 17/16* (2006.01)

(Continued)

(52) U.S. Cl.

CPC ........... *F04D 29/563* (2013.01); *F01D 5/141* (2013.01); *F01D 5/147* (2013.01); *F01D 9/041* (2013.01); *F01D 17/162* (2013.01); *F04D 29/547* (2013.01); *F01D 7/00* (2013.01); *F05D 2240/12* (2013.01); *F05D 2240/128* (2013.01)

(58) Field of Classification Search

CPC ...... F04D 29/563; F04D 29/547; F01D 5/141; F01D 5/147; F01D 9/041; F01D 17/162; F01D 7/00; F05D 2240/12; F05D 2240/128

See application file for complete search history.

(56) References Cited

U.S. PATENT DOCUMENTS

| | | | | |
|---|---|---|---|---|
| 7,806,652 | B2 | 10/2010 | Major | |
| 9,004,850 | B2 * | 4/2015 | Nichols | F04D 29/462 415/152.2 |
| 10,287,902 | B2 * | 5/2019 | Sak | F01D 9/041 |

(Continued)

FOREIGN PATENT DOCUMENTS

| | | | | |
|---|---|---|---|---|
| EP | 1980720 | A2 * | 10/2008 | F01D 17/162 |
| FR | 3052494 | B1 | 6/2018 | |
| FR | 3063102 | B1 | 3/2019 | |

OTHER PUBLICATIONS

EP Search Report for EP Patent Application No. 23190632.2 dated Jan. 2, 2024.

*Primary Examiner* — Brian Christopher Delrue

(74) *Attorney, Agent, or Firm* — Getz Balich LLC

(57) ABSTRACT

A gas turbine engine apparatus includes an engine flowpath, a protuberance and a variable vane. The protuberance projects into the engine flowpath. The variable vane extends across the engine flowpath. The variable vane includes a pivot axis and an airfoil. The variable vane is configured to pivot about the pivot axis between a first position and a second position. The airfoil extends spanwise along a span line between a first end and a second end. The airfoil extends chordwise along a chord line between a leading edge and a trailing edge. A recess extends spanwise into the airfoil from the first end. The airfoil, at the first end, is spaced from the protuberance when the variable vane is in the first position. The airfoil, at the first end, is aligned with the protuberance and the protuberance projects into the recess when the variable vane is in the second position.

19 Claims, 11 Drawing Sheets

(51) Int. Cl.
*F04D 29/54* (2006.01)
*F01D 7/00* (2006.01)

(56) References Cited

U.S. PATENT DOCUMENTS

| | | | | |
|---|---|---|---|---|
| 10,527,060 | B2 | 1/2020 | Reynolds | |
| 10,677,078 | B2 * | 6/2020 | Tse | F02C 3/145 |
| 11,572,798 | B2 * | 2/2023 | Poick | F04D 19/02 |
| 2011/0158793 | A1 | 6/2011 | Fritsch | |
| 2013/0287542 | A1 * | 10/2013 | Nichols | F01D 17/165<br>415/208.1 |
| 2020/0056486 | A1 | 2/2020 | Schrape | |
| 2022/0170380 | A1 | 6/2022 | Poick | |

* cited by examiner

VARIABLE VANE AIRFOIL WITH RECESS TO ACCOMMODATE PROTUBERANCE

TECHNICAL FIELD

This disclosure relates generally to a gas turbine engine and, more particularly, to a variable vane array for the gas turbine engine.

BACKGROUND INFORMATION

A gas turbine engine may include a variable vane array for guiding air flow into a compressor section. This variable vane array may also be used to regulate air flow into the compressor section. Various variable vane array configurations are known in the art. While these known variable vane arrays have various advantages, there is still room in the art for improvement. There is a need in the art, in particular, for a variable vane array which facilitates relatively large variable vane pivot angles.

SUMMARY

According to an aspect of the present disclosure, an apparatus is provided for a gas turbine engine. This gas turbine engine apparatus includes an engine flowpath, a protuberance and a variable vane. The protuberance projects into the engine flowpath. The variable vane extends across the engine flowpath. The variable vane includes a pivot axis and an airfoil. The variable vane is configured to pivot about the pivot axis between a first position and a second position. The airfoil extends spanwise along a span line between a first end and a second end. The airfoil extends chordwise along a chord line between a leading edge and a trailing edge. The airfoil extends laterally between a first side and a second side. A recess extends spanwise into the airfoil from the first end. The airfoil, at the first end, is spaced from the protuberance when the variable vane is in the first position. The airfoil, at the first end, is aligned with the protuberance and the protuberance projects into the recess when the variable vane is in the second position.

According to another aspect of the present disclosure, another apparatus is provided for a gas turbine engine. This gas turbine engine apparatus includes a variable vane. The variable vane includes a pivot axis and an airfoil. The variable vane is configured to pivot about the pivot axis more than forty degrees between a first position and a second position. The airfoil extends spanwise along a span line between a first end and a second end. The airfoil extends chordwise along a chord line between a leading edge and a trailing edge. The airfoil extends laterally between a first side and a second side. A recess extends spanwise into the airfoil from the first end.

According to still another aspect of the present disclosure, another apparatus is provided for a gas turbine engine. This gas turbine engine apparatus includes a platform and a variable vane. The platform extends circumferentially about a centerline. The platform includes a platform surface forming a peripheral boundary of an engine flowpath. The variable vane is pivotally mounted to the platform. The variable vane includes a pivot axis and an airfoil within the engine flowpath adjacent the platform surface. The variable vane is configured to pivot about the pivot axis between a first position and a second position. The airfoil extends spanwise along a span line between a first end and a second end. The airfoil extends chordwise along a chord line between a leading edge and a trailing edge. The airfoil extends laterally between a first side and a second side. A recess extends spanwise into the airfoil from the first end. The platform surface, at a location adjacent and upstream of the variable vane, has a first radius to the centerline. The platform surface, at a location adjacent and downstream of the variable vane, has a second radius to the centerline that is less than the first radius.

The variable vane may be configured to pivot about the pivot axis more than sixty degrees between the first position and the second position.

The gas turbine engine apparatus may also include a platform. The platform may include a platform surface. The airfoil may be spaced from the platform surface by a gap. The gap may have a uniform height chordwise along a section of the airfoil chordwise adjacent the recess and between the recess and the leading edge. The gap may have a variable height chordwise along the recess.

The gas turbine engine apparatus may also include an engine flowpath, a protuberance and a recess. The protuberance may project into the engine flowpath. The recess may extend spanwise into the airfoil from the first end. The airfoil, at the first end, may be spaced from the protuberance when the variable vane is in the first position. The airfoil, at the first end, may be aligned with the protuberance and the protuberance may project into the recess when the variable vane is in the second position.

The gas turbine engine apparatus may also include a second variable vane extending across the engine flowpath. The second variable vane may circumferentially neighbor the variable vane about a centerline of the apparatus. The second variable vane may include a button. The button may be configured as or otherwise include the protuberance.

The recess may project chordwise into the airfoil from the trailing edge.

The recess may project chordwise within the airfoil.

The recess may project spanwise into the airfoil to a recess end. At least a portion of the recess end may have a straight line geometry when viewed in a reference plane containing the pivot axis.

The recess may project spanwise into the airfoil to a recess end. At least a portion of the recess end may have a curved geometry when viewed in a reference plane containing the pivot axis.

The gas turbine engine apparatus may also include a platform. The platform may include a platform surface. The airfoil, at a location chordwise next to the recess, may be spaced from the platform surface by a first distance when the variable vane is in the first position. The airfoil, at a location chordwise within the recess, may be spaced from the platform surface by a second distance when the variable vane is in the first position. The second distance may be greater than the first distance.

The gas turbine engine apparatus may also include a platform. The platform may include a platform surface. The airfoil may be spaced from the platform surface by a gap. The gap may have a uniform height chordwise along a section of the airfoil chordwise between the recess and the leading edge. The gap may have a variable height chordwise along the recess.

The gas turbine engine apparatus may also include a platform extending circumferentially about a centerline. The platform may include a platform surface adjacent the first end. The platform surface, at a location upstream of the variable vane, may have a first radius to the centerline. The platform surface, at a location downstream of the variable vane, may have a second radius to the centerline that is less than the first radius.

The recess may have a spanwise height that is less than twenty percent of a total span length of the airfoil.

The variable vane may be configured to pivot about the pivot axis more than forty degrees.

The gas turbine engine apparatus may include a compressor section. The variable vane may be configured as an inlet guide vane for the compressor section.

The gas turbine engine apparatus may include a plurality of vanes arranged circumferentially about a centerline. The vanes may include the variable vane. The pivot axis may be parallel with the centerline.

The gas turbine engine apparatus may include a plurality of vanes arranged circumferentially about a centerline. The vanes may include the variable vane. The pivot axis may be angularly offset from the centerline by an acute angle.

The gas turbine engine apparatus may include a plurality of vanes arranged circumferentially about a centerline. The vanes may include the variable vane. The pivot axis may be perpendicular to the centerline.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
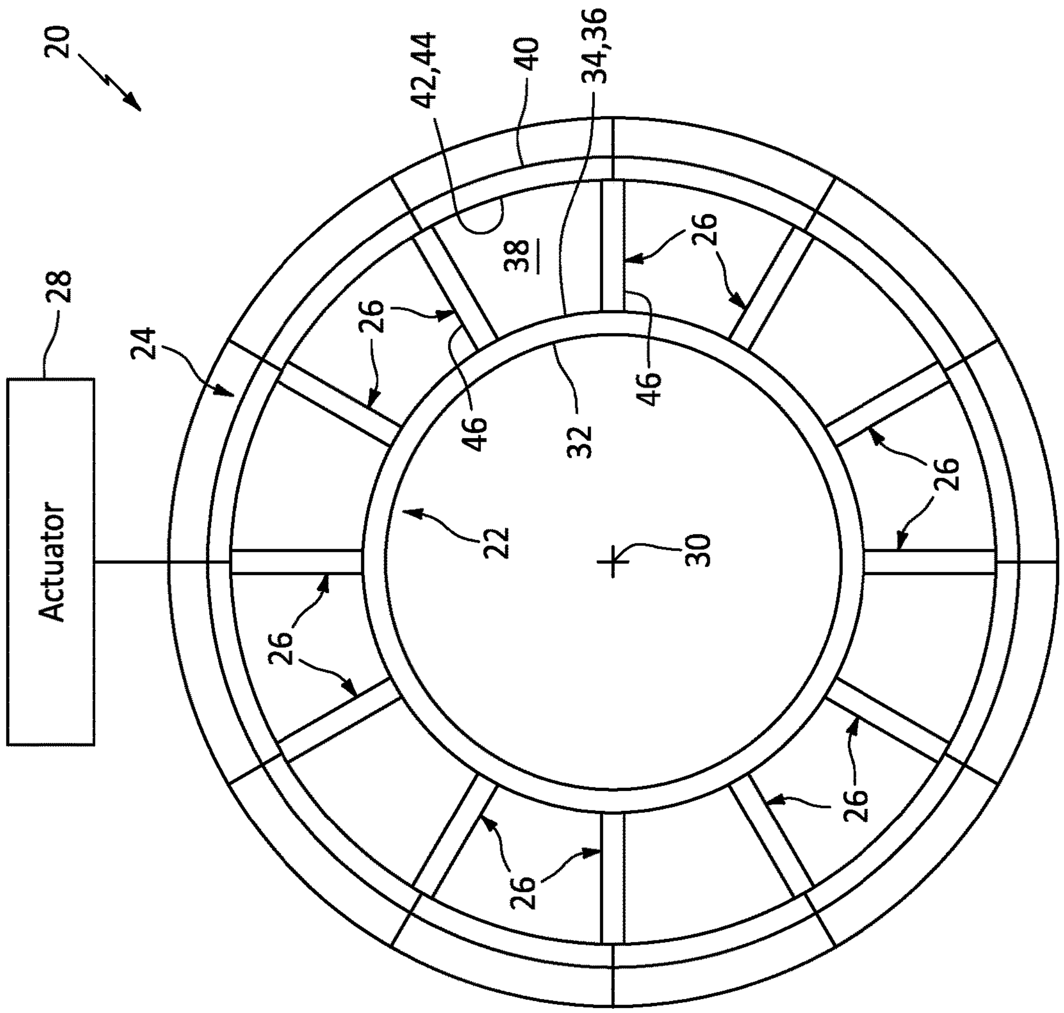
FIG. 1 is a schematic cross-sectional illustration of a variable vane array for a gas turbine engine.

FIG. 1 illustrates a variable vane array 20 for a gas turbine engine. This vane array 20 may be configured as a variable inlet guide vane array. The vane array 20, for example, may be arranged at (e.g., in, adjacent or proximate) an inlet to a compressor section of the gas turbine engine. The vane array 20 may alternatively be configured as a variable exit guide vane array. The vane array 20, for example, may be arranged at an exit from the compressor section. The vane array 20 may still alternatively be arranged intermediately within the compressor section (e.g., between two stages of the compressor section), or arranged adjacent or within another section of the gas turbine engine. The vane array 20 of FIG. 1 includes a first (e.g., inner) platform 22, a second (e.g., outer) platform 24, a plurality of variable vanes 26 (e.g., variable guide vanes such as inlet or exit guide vanes) and a vane actuator 28 for actuating (e.g., pivoting) the variable vanes 26.

Figure 2:
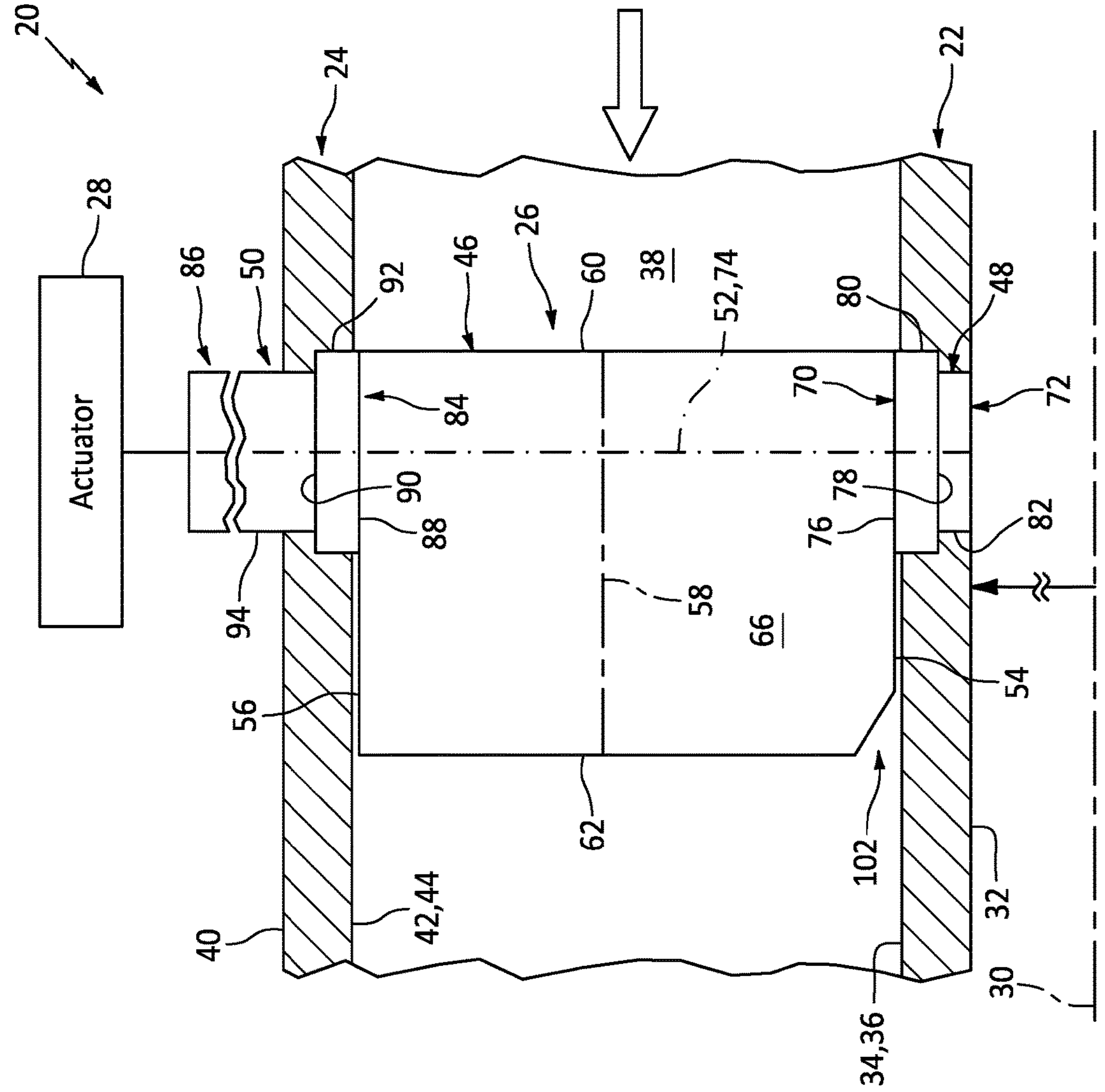
FIG. 2 is a partial side sectional illustration of the variable vane array.

The first platform 22 extends circumferentially about (e.g., completely around) an axial centerline 30 of the gas turbine engine providing the first platform 22 with, for example, a tubular geometry. The first platform 22 of FIG. 1 extends radially between and to an exterior side 32 (e.g., radial inner side) of the first platform 22 and an interior side 34 (e.g., radial outer side) of the first platform 22. Referring to FIG. 2, at least a portion (or an entirety) of the first platform 22 extends axially along the axial centerline 30. The first platform 22 of FIGS. 1 and 2 includes a first platform surface 36 at the first platform interior side 34. This first platform surface 36 forms a first (e.g., inner) peripheral boundary of a flowpath 38 (e.g., an annular core flowpath) through the vane array 20 and within the gas turbine engine.

Referring to FIG. 1, the second platform 24 extends circumferentially about (e.g., completely around) the axial centerline 30 providing the second platform 24 with, for example, a tubular geometry. The second platform 24 of FIG. 1 extends radially between and to an exterior side 40 (e.g., radial outer side) of the second platform 24 and an interior side 42 (e.g., radial inner side) of the second platform 24. Referring to FIG. 2, at least a portion (or an entirety) of the second platform 24 extends axially along the axial centerline 30. The second platform 24 of FIGS. 1 and 2 includes a second platform surface 44 at the second platform interior side 42. This second platform surface 44 axially overlaps and circumscribes the first platform surface 36, and may be generally parallel with the first platform surface 36. The second platform surface 44 forms a second (e.g., outer) peripheral boundary of the engine flowpath 38. The engine flowpath 38 of FIG. 2 may thereby extend radially between and to the first platform surface 36 and the second platform surface 44.

Referring to FIG. 1, the variable vanes 26 are arranged circumferentially about the axial centerline 30 in a circular array. Within this circular array, each variable vane 26 is located circumferentially between and is circumferentially spaced from its respective circumferentially neighboring (e.g., adjacent) variable vanes 26. Each of the variable vanes 26 of FIG. 1 extends radially across the engine flowpath 38 between and to the first platform 22 and the second platform 24. Referring to FIG. 2, each of the variable vanes 26 includes a vane airfoil 46, a vane first (e.g., inner) attachment 48 and a vane second (e.g., outer) attachment 50.

Figure 3:
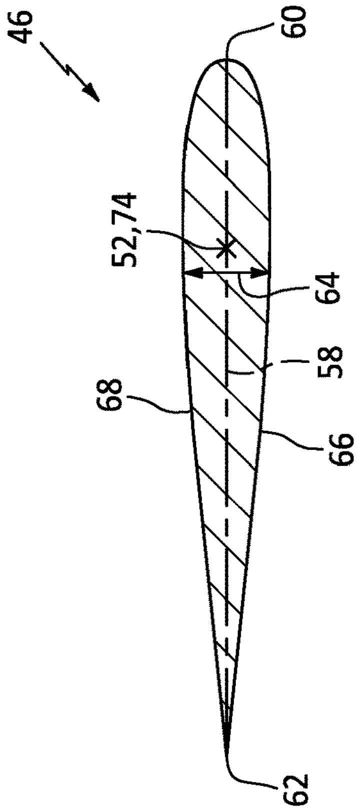
FIG. 3 is a cross-sectional illustration of a variable vane airfoil.

The vane airfoil 46 extends spanwise along a span line 52 of the vane airfoil 46 between and to a first end 54 (e.g., an inner, base end) of the vane airfoil 46 and a second end 56 (e.g., an outer, tip end) of the vane airfoil 46. The vane airfoil 46 extends chordwise along a chord line 58 of the vane airfoil 46 between and to a leading edge 60 of the vane airfoil 46 and a trailing edge 62 of the vane airfoil 46. Referring to FIG. 3, the vane airfoil 46 extends laterally along a thickness 64 of the vane airfoil 46 between and to a first side 66 of the vane airfoil 46 and a second side 68 of the vane airfoil 46. The airfoil first side 66 and the airfoil second side 68 extend spanwise along the span line 52 between and to the airfoil first end 54 and the airfoil second end 56 (see FIG. 2). The airfoil first side 66 and the airfoil second side 68 extend chordwise along the chord line 58 between and meet at the airfoil leading edge 60 and the airfoil trailing edge 62.

Referring to FIG. 2, the first attachment 48 is connected to (e.g., formed integral with or otherwise fixedly attached to) the vane airfoil 46 at its airfoil first end 54. This first attachment 48 of FIG. 2 includes a first button 70 (e.g., a puck) and a first shaft 72.

The first button 70 extends along a vane pivot axis 74 of the respective variable vane 26 between and to a flowpath side 76 of the first button 70 and a bearing side 78 of the first button 70, which vane pivot axis 74 may be parallel with the airfoil span line 52. The first button flowpath side 76 is adjacent the vane airfoil 46 at its airfoil first end 54. At least a portion of the first button flowpath side 76 is offset from the first platform surface 36 such that the first button 70 projects slightly into the engine flowpath 38 to its first button flowpath side 76, thereby forming a protuberance in the engine flowpath 38. The first button 70 projects radially (relative to the vane pivot axis 74) out to an (e.g., cylindrical) outer periphery 80 of the first attachment 48 and its first button 70. This first button outer periphery 80 may be axially aligned with (or offset from) the airfoil leading edge 60. The first button outer periphery 80 may be recessed (e.g., spaced towards the vane pivot axis 74 from) the airfoil trailing edge 62 such that the vane airfoil 46 projects chordwise out from (e.g., overhangs out from) the first attachment 48 and its first button 70 to the airfoil trailing edge 62.

The first shaft 72 is connected to the first button 70 at the first button bearing side 78. The first shaft 72 projects along the vane pivot axis 74 out from the first button 70 to a distal end of the first shaft 72. The first shaft 72 projects radially (relative to the vane pivot axis 74) out to an (e.g., cylindrical) outer periphery 82 of the first shaft 72. This first shaft outer periphery 82 is recessed inwards from the first button outer periphery 80.

The second attachment 50 is connected to (e.g., formed integral with or otherwise fixedly attached to) the vane airfoil 46 at its airfoil second end 56. This second attachment 50 of FIG. 2 includes a second button 84 (e.g., a puck) and a second shaft 86.

The second button 84 extends along the vane pivot axis 74 of the respective variable vane 26 between and to a flowpath side 88 of the second button 84 and a bearing side 90 of the second button 84. The second button flowpath side 88 is adjacent the vane airfoil 46 at its airfoil second end 56. At least a portion of the second button flowpath side 88 may be offset from the second platform surface 44 such that the second button 84 projects slightly into the engine flowpath 38 to its second button flowpath side 88. The second button 84 projects radially (relative to the vane pivot axis 74) out to an (e.g., cylindrical) outer periphery 92 of the second attachment 50 and its second button 84. This second button outer periphery 92 may be axially aligned with (or offset from) the airfoil leading edge 60. The second button outer periphery 92 may be recessed (e.g., spaced towards the vane pivot axis 74 from) the airfoil trailing edge 62 such that the vane airfoil 46 projects chordwise out from (e.g., overhangs out from) the second attachment 50 and its second button 84 to the airfoil trailing edge 62.

The second shaft 86 is connected to the second button 84 at the second button bearing side 90. The second shaft 86 projects along the vane pivot axis 74 out from the second button 84 to a distal end of the second shaft 86. The second shaft 86 projects radially (relative to the vane pivot axis 74) out to an (e.g., cylindrical) outer periphery 94 of the second shaft 86. This second shaft outer periphery 94 is recessed inwards from the second button outer periphery 92.

Figure 4:
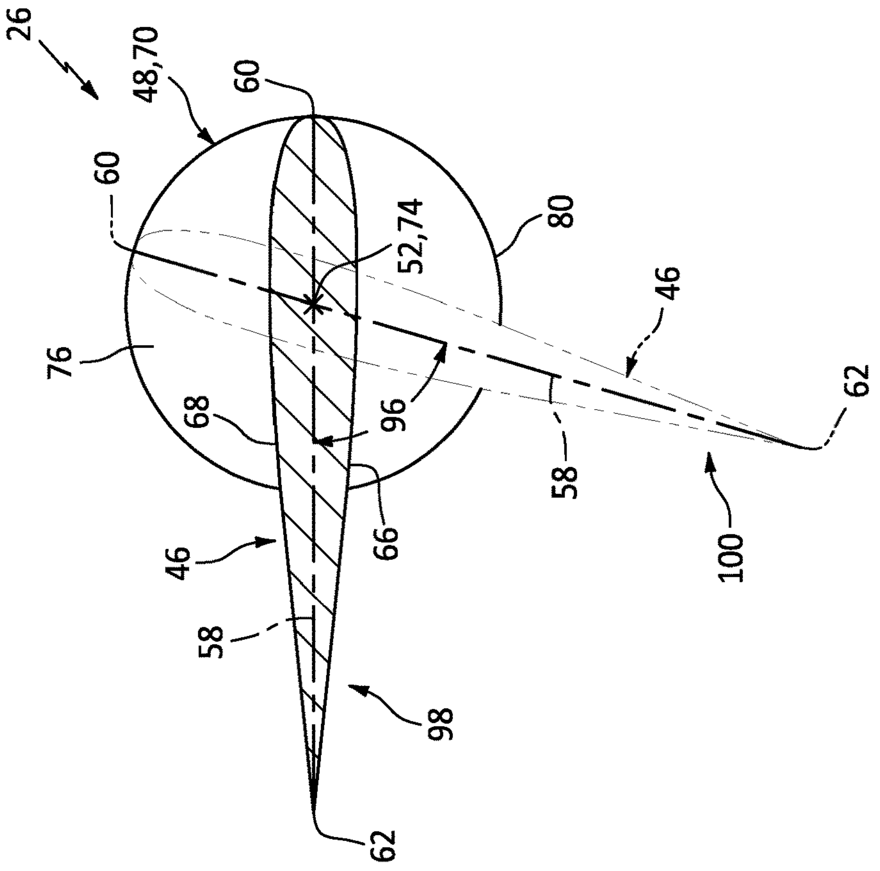
FIG. 4 is a schematic illustration depicting a variable vane with its variable vane airfoil pivoting between a first position and a second position.

Each variable vane 26 and its vane airfoil 46 are pivotally connected to the first platform 22 by its first attachment 48. Each first attachment 48, for example, is mated with/received within a respective first receptacle in the first platform 22. Each variable vane 26 and its vane airfoil 46 are pivotally connected to the second platform 24 by its second attachment 50. Each second attachment 50, for example, is mated with/received within a respective second receptacle in the second platform 24. With this arrangement, the attachments function as bearings between the respective variable vane 26 and the platforms 22 and 24. Referring to FIG. 4, each variable vane 26 may thereby pivot a select number of degrees (referred to below as a pivot angle 96) about its respective vane pivot axis 74 between and to a first position 98 (e.g., an open position) and a second position 100 (e.g., a closed position). This pivot angle 96 may be greater than forty degrees (40°), but may be less than ninety degrees (90°). The pivot angle 96, for example, may be at least fifty degrees (50°), sixty degrees (60°) or seventy degrees (70°). Such a large pivot angle 96 may facilitate substantially metering (e.g., closing off) gas flow (e.g., air flow) through the vane array 20 and, for example, into the compressor section when the variable vanes 26 are in their second positions 100. The present disclosure, however, is not limited to such a relatively large pivot angle 96. The pivot angle 96, for example, may alternatively be less than forty degrees (40°) depending on, for example, other parameters of the vane array 20 such as variable vane spacing.

Figure 5:
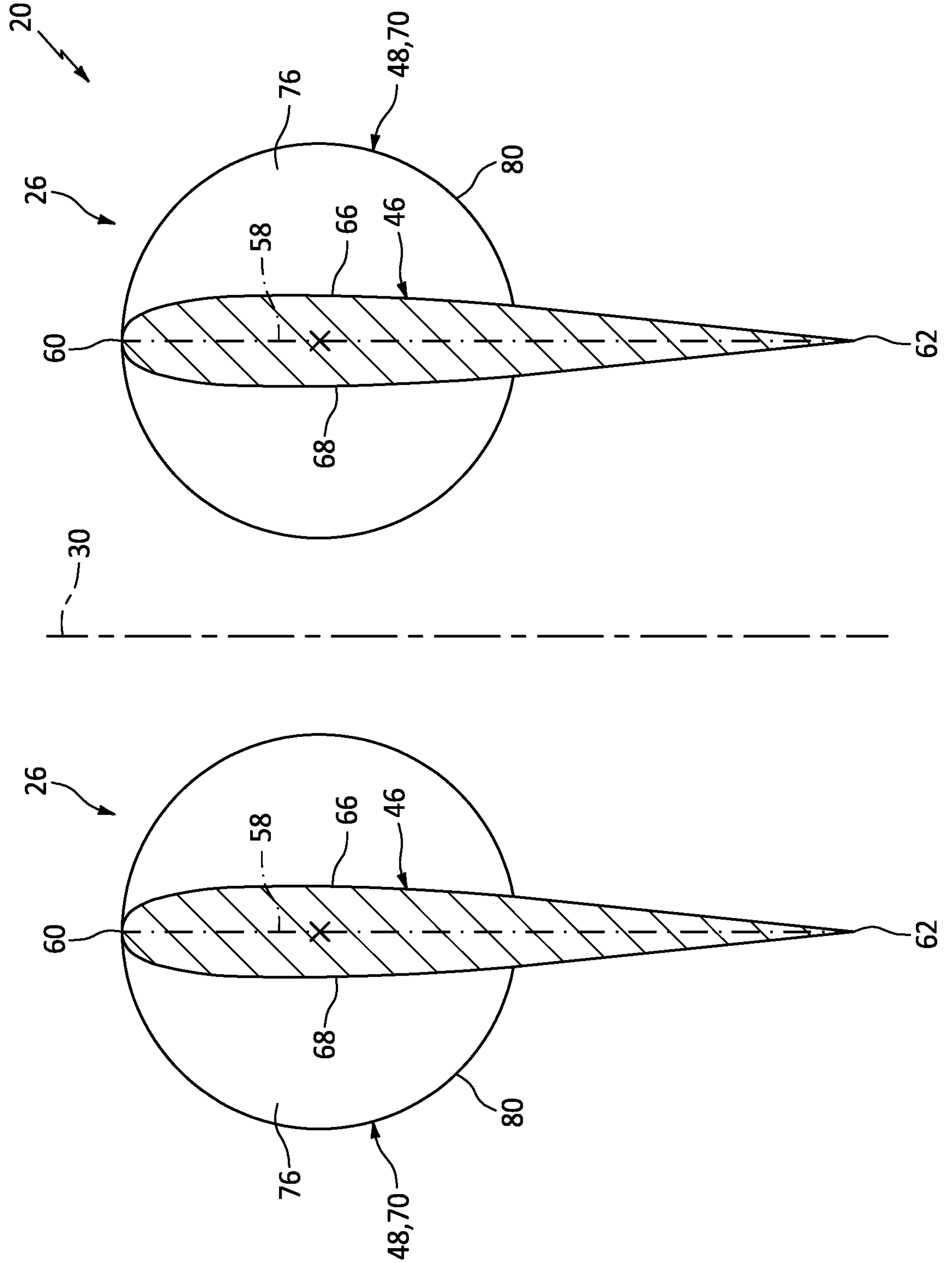
FIG. 5 is a sectional illustration of the variable vane array with two of its variable vane airfoils in the first positions.

Referring to FIG. 5, when the variable vanes 26 are in their first positions, the chord line 58 of each variable vane 26 may be parallel with the axial centerline 30, or angularly offset from the axial centerline 30 by a relatively small acute angle; e.g., less than ten degrees (10°) or five degrees (5°). With such an arrangement, each vane airfoil 46 is spaced (e.g., circumferentially) relatively far from the circumferentially neighboring vane airfoils 46 (one visible in FIG. 5). Each vane airfoil 46 may also be spaced (e.g., circumferentially) relatively far from the circumferentially neighboring first attachments 48 and their first buttons 70 (one visible in FIG. 5). Each vane airfoil 46 of FIG. 5 thereby is not aligned with (e.g., does not overlap) another variable vane first button 70 when in its first position.

Figure 6:
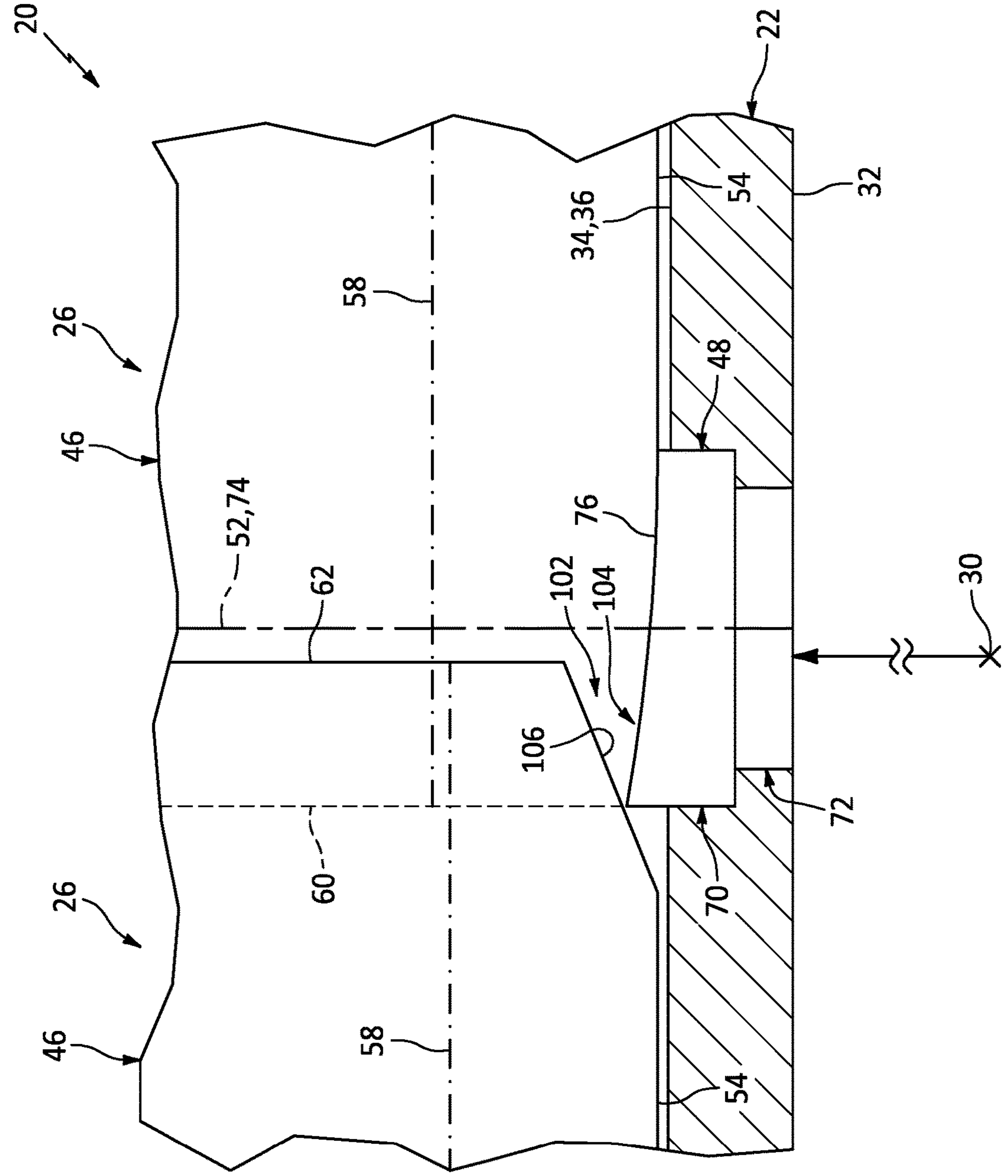
FIG. 6 is a partial cross-sectional illustration of the variable vane array with its variable vane airfoils in the second positions.
Figure 7:
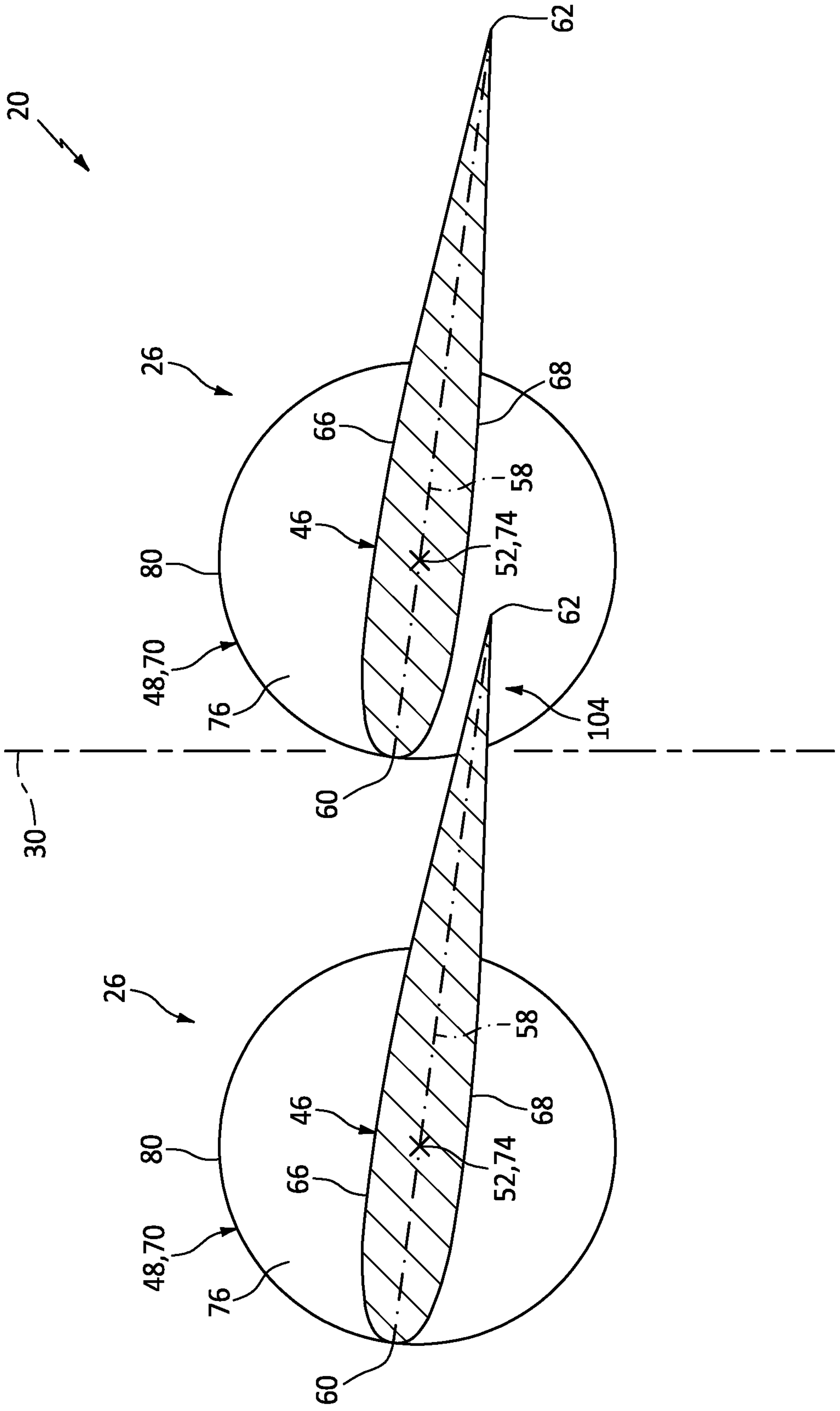
FIG. 7 is a sectional illustration of the variable vane array with two of its variable vane airfoils in the second positions.

Referring to FIGS. 6 and 7, when the variable vanes 26 are in their second positions, the chord line 58 of each variable vane 26 may be angularly offset from the axial centerline 30 by a relatively large acute angle (see FIG. 7); e.g., greater than forty degrees (40°), fifty degrees (50°), sixty degrees (60°) or seventy degrees (70°). Each vane airfoil 46 may thereby be in close proximity (e.g., close) to a circumferentially neighboring one of the vane airfoils 46. Each vane airfoil 46 may therefore also be in close proximity to a circumferentially neighboring one of the first attachments 48 and its first button 70. Each vane airfoil 46 of FIGS. 6 and 7 may thereby be aligned with (e.g., circumferentially overlap, project over, etc.) the respective circumferentially neighboring first attachment 48 and its first button 70. To prevent interference (e.g., contact) between the vane airfoils 46 and the first buttons 70, each vane airfoil 46 of FIG. 6 is configured with a recess 102 (e.g., a cutout, a notch or a groove) at/along its airfoil first end 54 which receives a protuberance 104 of the respective neighboring first button 70. When the vane airfoil 46 and its airfoil first end 54 are aligned with this respective first button 70 and its protuberance 104, the first button 70 and its protuberance 104 may project into the airfoil recess 102. The airfoil recess 102 thereby provides clearance for the first button 70 and its protuberance 104 when the vane airfoil 46 is in its second position.

Figure 8:
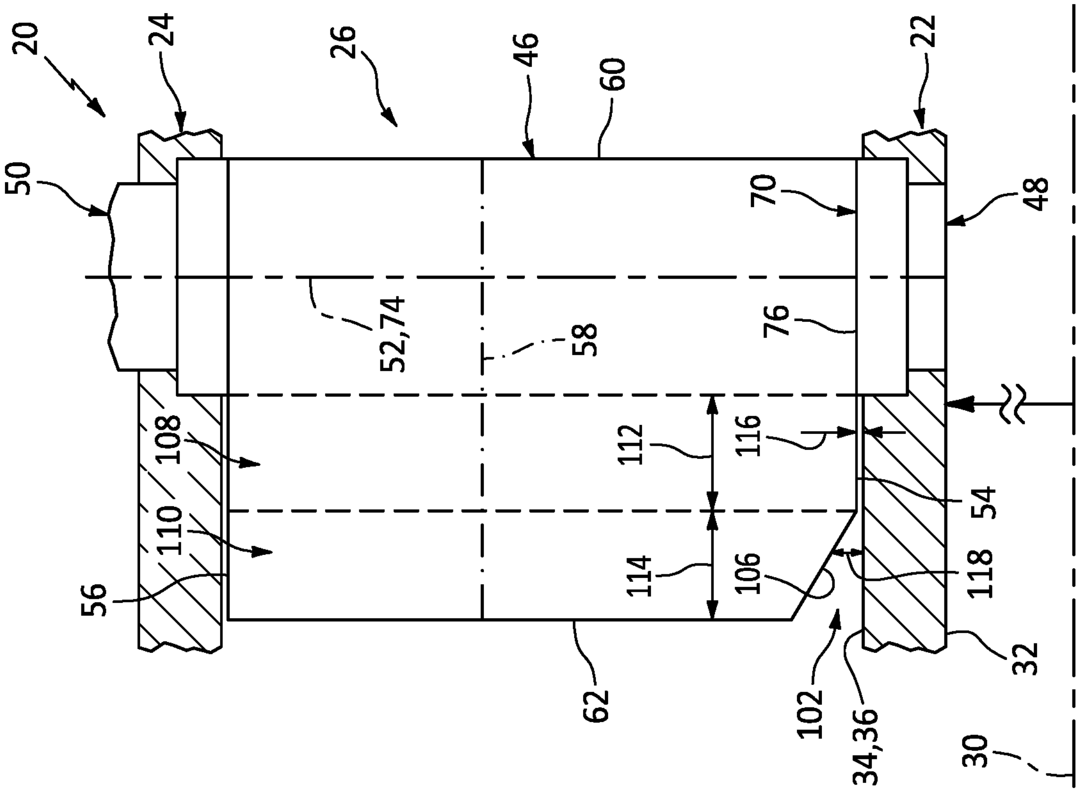
FIG. 8 is a partial side sectional illustration of the variable vane array with a recess projecting chordwise into the vane airfoil.
Figure 9:
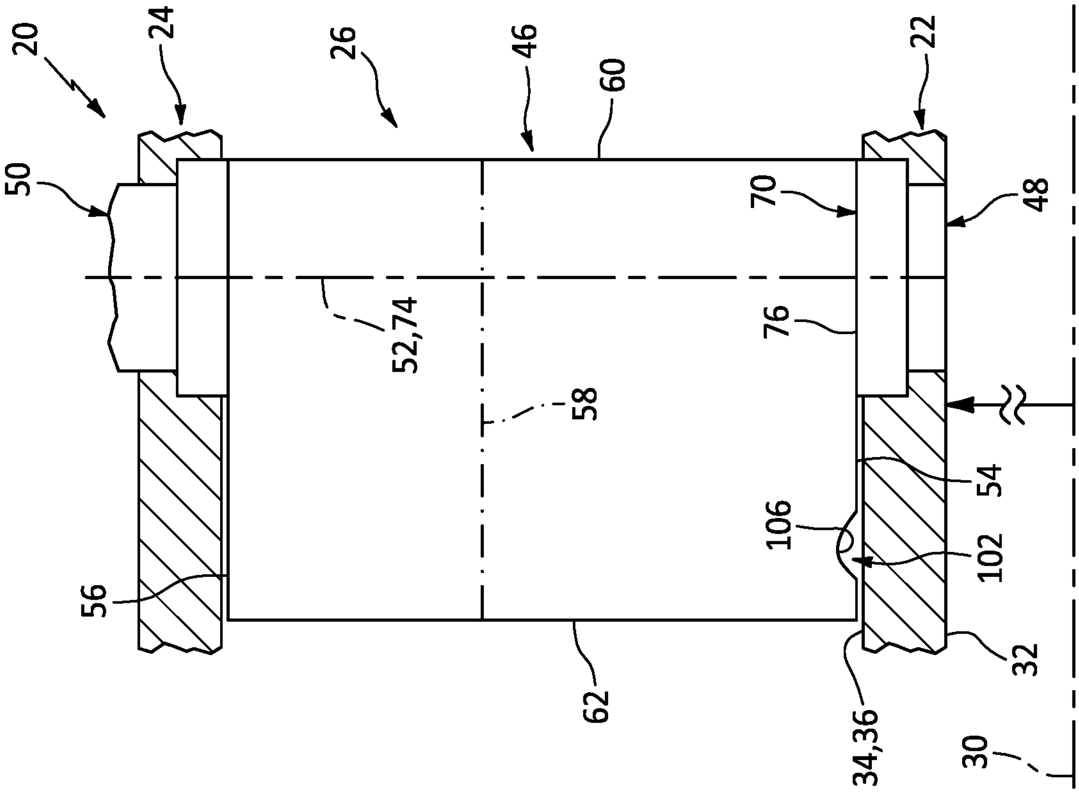
FIG. 9 is a partial side sectional illustration of the variable vane array with the recess projecting chordwise within the vane airfoil.

Referring to FIG. 8, the airfoil recess 102 projects spanwise partially into the respective vane airfoil 46 at the airfoil first end 54. The airfoil recess 102 of FIG. 8, for example, projects spanwise into the respective vane airfoil 46 from the airfoil first end 54 to an end 106 (e.g., a peripheral edge) of the airfoil recess 102. This airfoil recess 102 extends laterally through the vane airfoil 46 between and to the airfoil first side 66 and the airfoil second side 68 (see FIG. 3). The airfoil recess 102 of FIG. 8 also projects chordwise partially into the respective vane airfoil 46 at the airfoil trailing edge 62. The airfoil recess 102 of FIG. 8, for example, projects chordwise into the respective vane airfoil 46 from the airfoil trailing edge 62 to the recess end 106. In other embodiments however, referring to FIG. 9, the airfoil recess 102 may alternatively extend chordwise within the respective vane airfoil 46 between, for example, opposing sides of the recess end 106.

Referring to FIG. 8, a portion of the vane airfoil 46 projecting chordwise out from the first attachment 48 (e.g., the first button 70) of the same variable vane 26 may include one or more chordwise sections 108 and 110. The intermediate section 108 of the vane airfoil 46 is disposed and may extend chordwise between the first attachment 48 and its first button 70 and the recess section 110 of the vane airfoil 46; e.g., a trailing edge section of the vane airfoil 46. The intermediate section 108 has an intermediate section length 112 along the chord line 58 and the recess section 110 has a recess section length 114 along the chord line 58, which recess section length 114 may be equal to or different (e.g., smaller, or greater) than the intermediate section length 112. When the vane airfoil 46 is in its first position, the airfoil first end 54 along the intermediate section 108 is spaced an intermediate section distance 116 spanwise (e.g., axially along the pivot axis 74) from the underlying first platform surface 36. This intermediate section distance 116 may remain exactly or substantially (e.g., +/−2%) uniform (e.g., constant) along the intermediate section length 112 to provide a clearance gap with a uniform gap height between the first platform surface 36 and the vane airfoil 46 and its intermediate section 108. By contrast, when the vane airfoil 46 is still in its first position, the recess end 106 along the recess section 110 is spaced a recess section distance 118 spanwise from the underlying first platform surface 36. This recess section distance 118 is different (e.g., greater) than the intermediate section distance 116. Furthermore, the recess section distance 118 may vary along the recess section length 114 to provide the airfoil recess 102 with a variable recess height between the first platform surface 36 and the vane airfoil 46 and its recess section 110. In other words, while the intermediate section 108 is configured to substantially follow a contour the first platform surface 36 when the vane airfoil 46 is in its first position, the recess section 110 is configured to diverge away from the contour of the first platform surface 36 to form the airfoil recess 102.

In some embodiments, the airfoil recess 102 may have a (e.g., maximum) spanwise height measured between the airfoil first end 54, at a location adjacent the airfoil recess 102, and the recess end 106. This recess spanwise height may be less than twenty percent (20%), fifteen percent (15%) or ten percent (10%) of a total spanwise height of the vane airfoil 46 between the airfoil first end 54 and the airfoil second end 56. The present disclosure, however, is not limited to such an exemplary dimensional relationship.

Figure 11B:
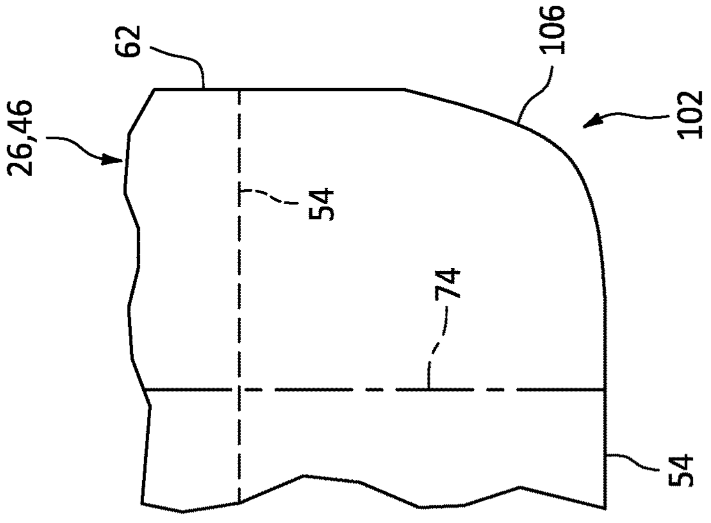
FIGS. 11A and 11B are partial illustrations of the vane airfoil at the recess, where the recess has various curved geometries.
Figure 11A:
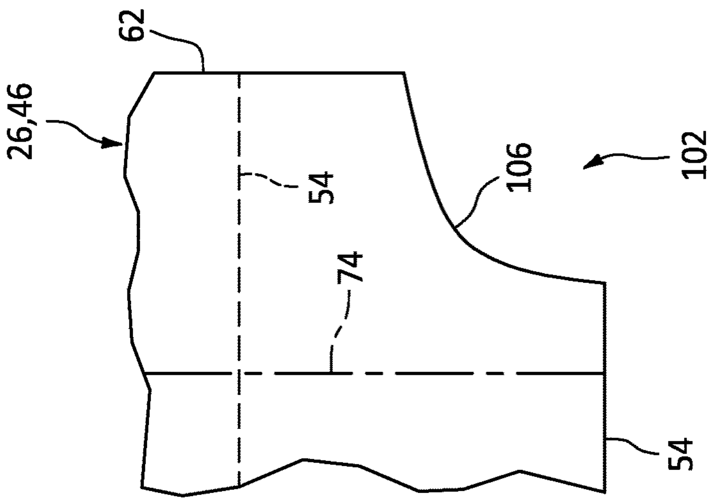
Figure 10:
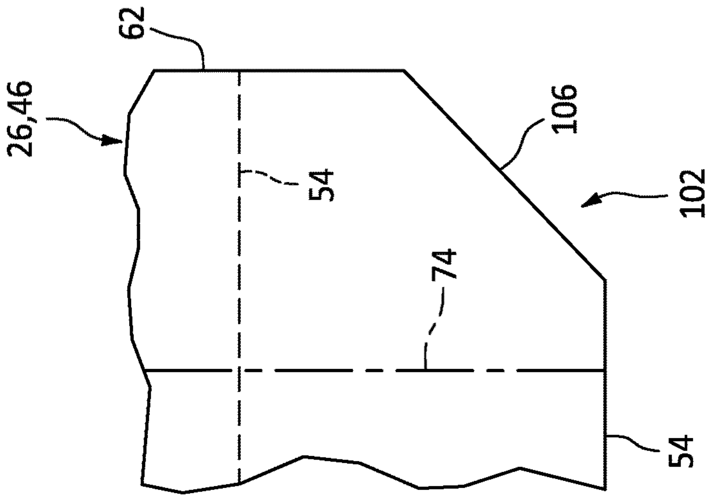
FIG. 10 is partial illustration of the vane airfoil at the recess, where the recess has a straight line geometry.

In some embodiments, referring to FIG. 10, at least a portion or an entirety of the recess end 106 may have/follow a straight line geometry when viewed, for example, in a reference plane containing the pivot axis 74. In other embodiments, referring to FIGS. 11A and 11B, at least a portion or an entirety of the recess end 106 may have/follow a curved (e.g., arcuate, splined, concave, convex, etc.) geometry when viewed, for example, in the reference plane.

Figure 12:
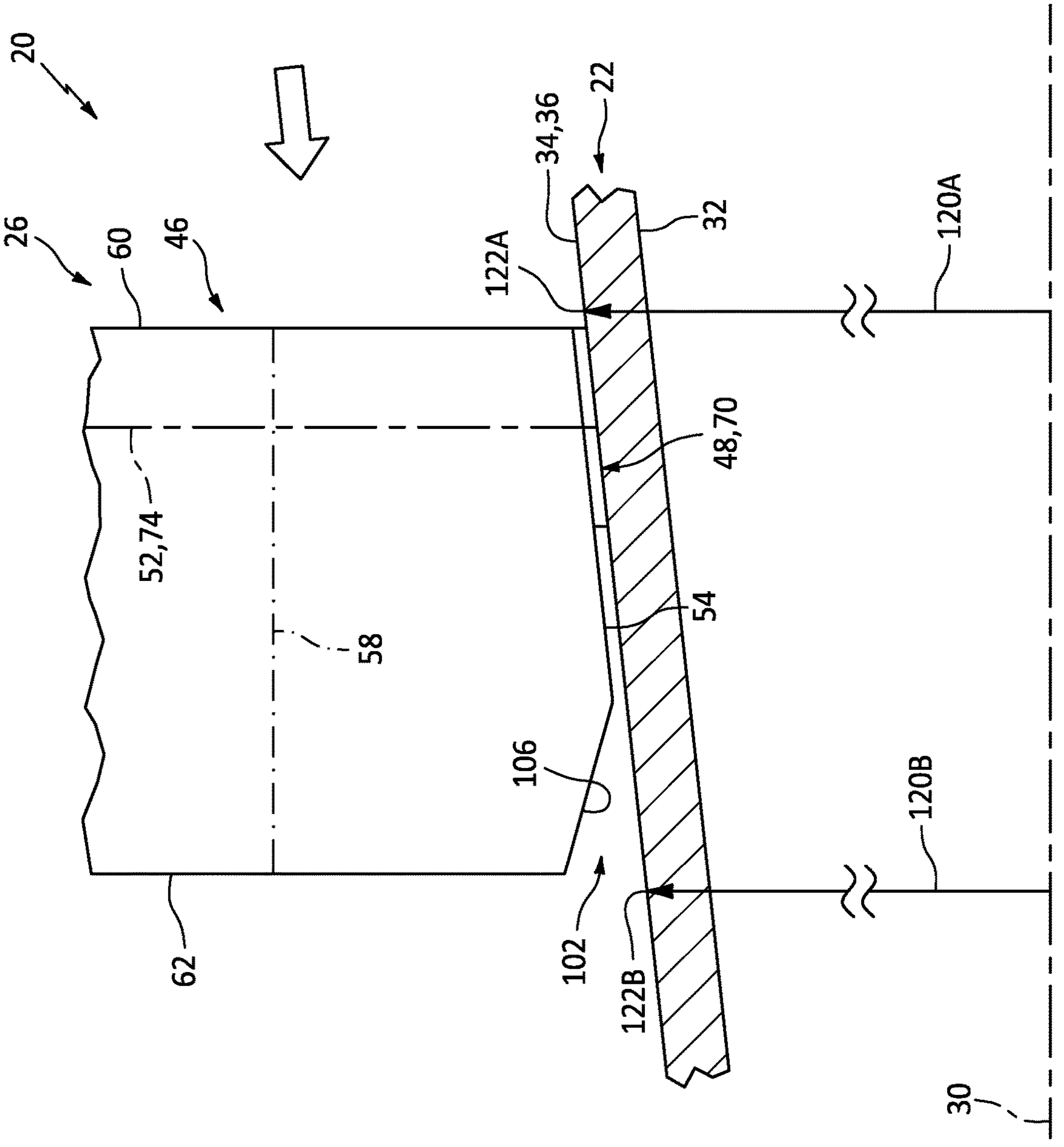
FIG. 12 is a partial side sectional illustration of the variable vane array with a tapered platform.

In some embodiments, referring to FIG. 12, the first platform 22 and its first platform surface 36 may taper radially inward towards the axial centerline 30 as the first platform 22 and its first platform surface 36 extend axially along the axial centerline 30 in a downstream direction. The first platform surface 36, for example, has a first radius 120A from the axial centerline 30 at a first location 122A and a second radius 120B from the axial centerline 30 at a second location 122B downstream from the first location 122A, where the first radius 120A is greater than the second radius 120B. The first location 122A, for example, may be upstream of the variable vanes 26 or at the airfoil leading edges 60 when the variable vanes 26 are in their first positions. The second location 122B may be downstream of the variable vanes 26 or at the airfoil trailing edges 62 when the variable vanes 26 are in their second positions. Such a tapered platform arrangement may bolster the use for the airfoil recesses 102. The present disclosure, however, is not limited to such an exemplary first platform arrangement.

In some embodiments, at least a portion or an entirety of each respective first button 70 may form the protuberance (e.g., see FIG. 6) which would otherwise impede pivoting of a respective vane airfoil 46 to its second position. However, in other embodiments, the vane airfoils 46 may also or alternatively be configured to avoid other (e.g., non-button) protuberances such as, but not limited to, humps in a platform surface, portions of a stationary vane, etc.

Figure 13:
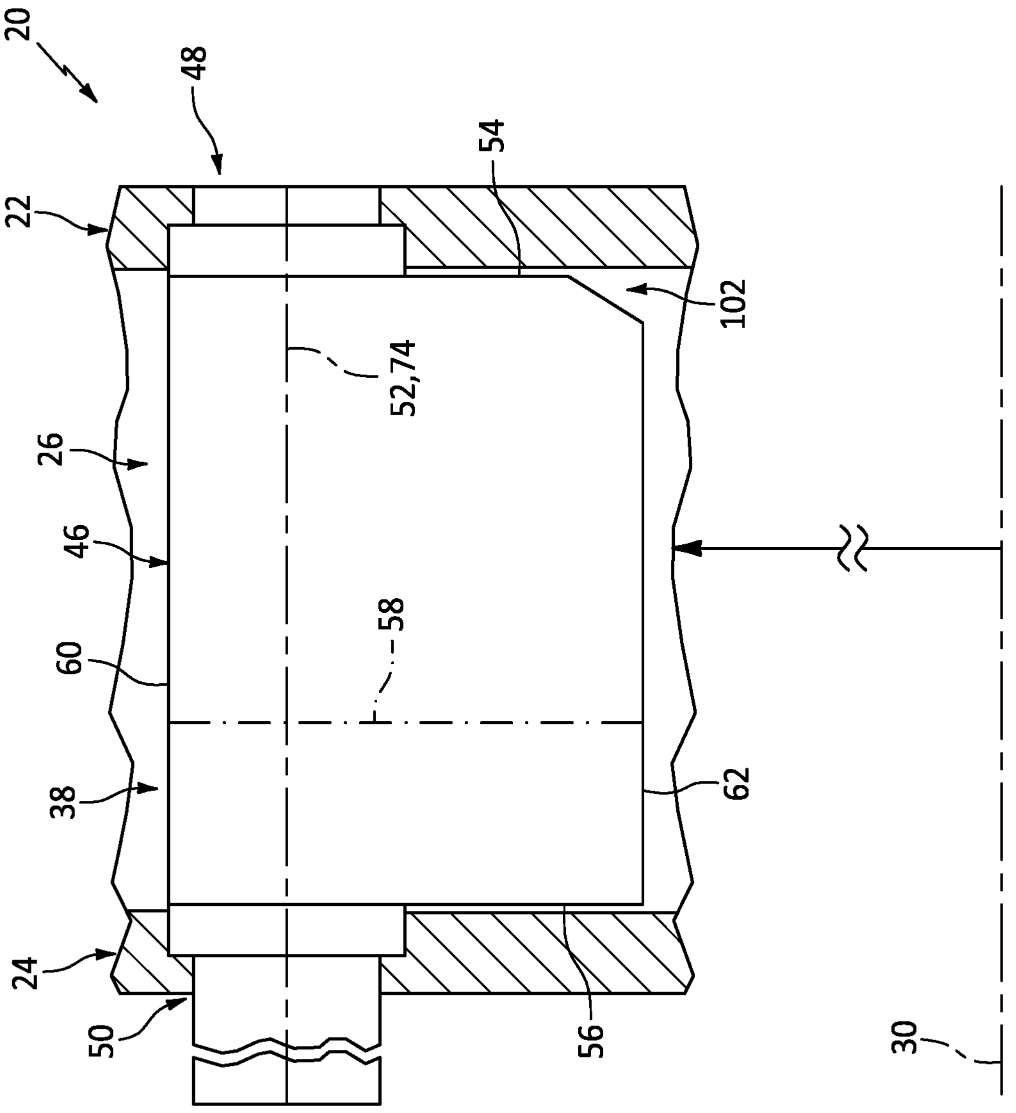
FIG. 13 is a partial side sectional illustration of the variable vane array configured for a radially extending flowpath.

Referring to FIG. 2, the vane array 20 is described above with respect to a portion of the engine flowpath 38 that extends substantially (or only) axially along the axial centerline 30. With this arrangement, each vane pivot axis 74 is perpendicular to the axial centerline 30, or angularly offset from the axial centerline 30 by a relatively large acute angle; e.g., an angle equal to greater than forty-five degrees (45°) or sixty degrees (60°). In other embodiments however, referring to FIG. 13, the vane array 20 may be configured along a portion of the engine flowpath 38 that extends substantially (or only) radially with respect to the axial centerline 30. With this arrangement, each vane pivot axis 74 is parallel with the axial centerline 30, or angularly offset from the axial centerline 30 by a relatively small acute angle; e.g., an angle less than forty-five degrees (45°) or thirty degrees (30°).

Figure 14:
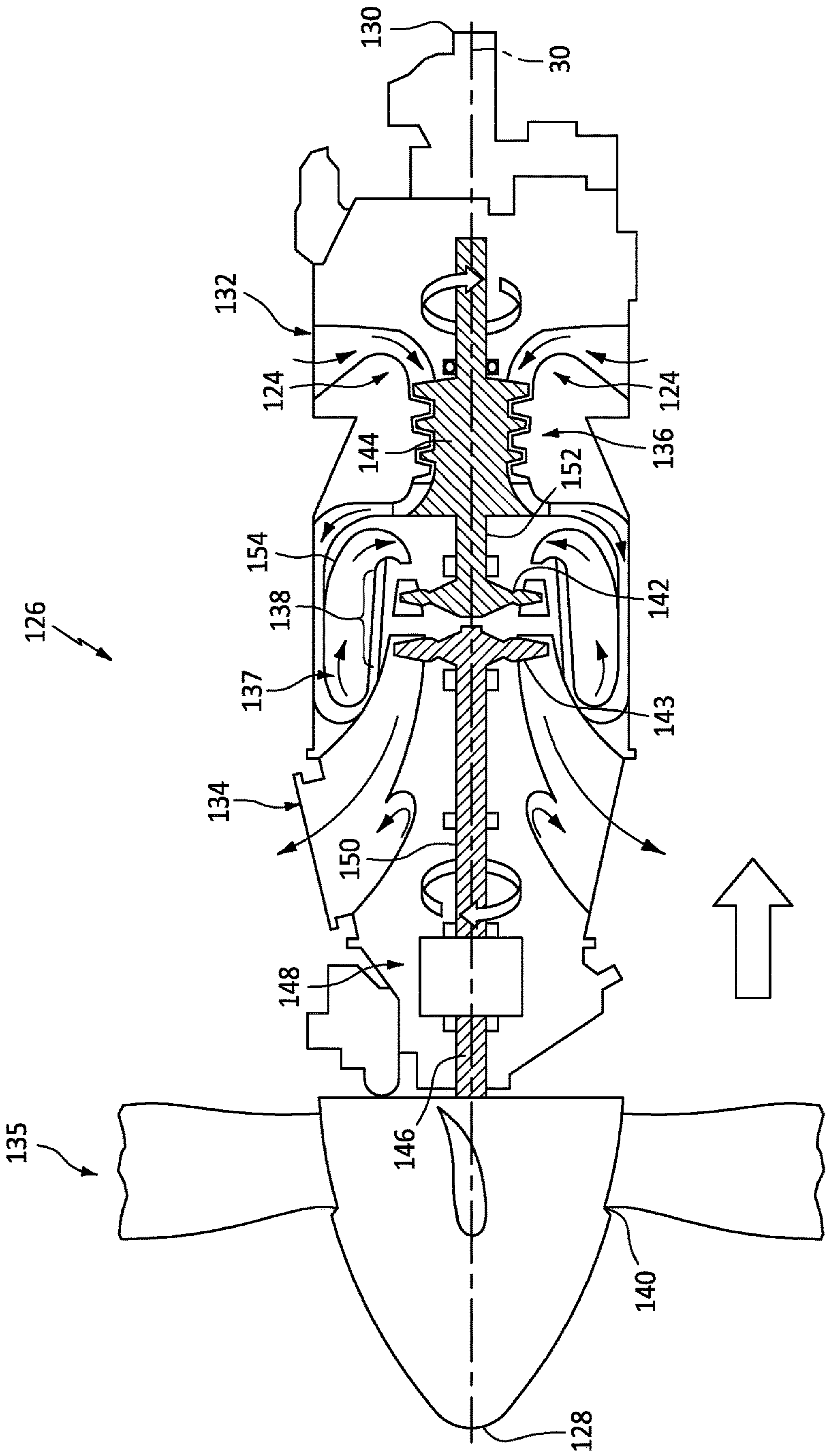
FIG. 14 is a side schematic illustration of a gas turbine engine.

FIG. 14 illustrates an example of the gas turbine engine with which the vane array 20 may be configured; e.g., in compressor inlet region 124. This gas turbine engine is configured as a turboprop gas turbine engine 126. This gas turbine engine 126 of FIG. 14 extends axially along the axial centerline 30 between a forward end 128 of the gas turbine engine 126 and an aft end 130 of the gas turbine engine 126. The gas turbine engine 126 of FIG. 14 includes an airflow inlet 132, an exhaust 134, a propulsor (e.g., a propeller) section 135, the compressor section 136, a combustor section 137 and a turbine section 138.

The airflow inlet 132 is located towards the engine aft end 130, and aft of the engine sections 135-138. The exhaust 134 is located towards the engine forward end 128, and axially between the propulsor section 135 and the engine sections 136-138.

The propulsor section 135 includes a propulsor rotor 140; e.g., a propeller. The compressor section 136 includes a compressor rotor 141. The turbine section 138 includes a high pressure turbine (HPT) rotor 142 and a low pressure turbine (LPT) rotor 143, where the LPT rotor 143 may be referred to as a power turbine rotor and/or a free turbine rotor. Each of these turbine engine rotors 140-143 includes a plurality of rotor blades arranged circumferentially about and connected to one or more respective rotor disks or hubs.

The propulsor rotor 140 of FIG. 14 is connected to the LPT rotor 143 sequentially through a propulsor shaft 146, a geartrain 148 (e.g., a transmission) and a low speed shaft 150. The compressor rotor 141 is connected to the HPT rotor 142 through a high speed shaft 152.

During gas turbine engine operation, air enters the gas turbine engine 126 through the airflow inlet 132. This air is directed into the engine flowpath 38 which extends sequentially from the airflow inlet 132, through the engine sections 136-138 (e.g., an engine core), to the exhaust 134. The air within this engine flowpath 38 may be referred to as "core air".

The core air is compressed by the compressor rotor 141 and directed into a combustion chamber of a combustor 154 in the combustor section 137. Fuel is injected into the combustion chamber and mixed with the compressed core air to provide a fuel-air mixture. This fuel-air mixture is ignited and combustion products thereof flow through and sequentially cause the HPT rotor 142 and the LPT rotor 143 to rotate. The rotation of the HPT rotor 142 drives rotation of the compressor rotor 141 and, thus, compression of air received from the airflow inlet 132. The rotation of the LPT rotor 143 drives rotation of the propulsor rotor 140, which propels air outside of the turbine engine in an aft direction to provide forward aircraft thrust.

The vane array 20 may be included in various gas turbine engines other than the one described above. The vane array 20, for example, may be included in a geared gas turbine engine where a gear train connects one or more shafts to one or more rotors in a fan section, a compressor section and/or any other engine section. Alternatively, the vane array 20 may be included in a gas turbine engine configured without a gear train. The vane array 20 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
an engine flowpath;
a protuberance projecting into the engine flowpath;
a variable vane extending across the engine flowpath, the variable vane comprising a pivot axis and an airfoil, the variable vane configured to pivot about the pivot axis between a first position and a second position;
the airfoil extending spanwise along a span line between a first end and a second end, the airfoil extending chordwise along a chord line between a leading edge and a trailing edge, the airfoil extending laterally between a first side and a second side, and a recess extending spanwise into the airfoil from the first end;
the airfoil, at the first end, spaced from the protuberance when the variable vane is in the first position; and
the airfoil, at the first end, aligned with the protuberance and the protuberance projecting into the recess when the variable vane is in the second position; and
a platform comprising a platform surface;
the airfoil spaced from the platform surface by a gap, the gap having a uniform height chordwise along a section of the airfoil chordwise between the recess and the leading edge, and the gap having a variable height chordwise along the recess.

2. The apparatus of claim 1, further comprising:
a second variable vane extending across the engine flowpath, the second variable vane circumferentially neighboring the variable vane about a centerline of the apparatus, and the second variable vane comprising a button;
the button comprising the protuberance.

3. The apparatus of claim 1, wherein the recess projects chordwise into the airfoil from the trailing edge.

4. The apparatus of claim 1, wherein the recess projects chordwise within the airfoil.

5. The apparatus of claim 1, wherein
the recess projects spanwise into the airfoil to a recess end; and
at least a portion of the recess end has a straight line geometry when viewed in a reference plane containing the pivot axis.

6. The apparatus of claim 1, wherein
the recess projects spanwise into the airfoil to a recess end; and
at least a portion of the recess end has a curved geometry when viewed in a reference plane containing the pivot axis.

7. The apparatus of claim 1, wherein
the airfoil, at a location chordwise next to the recess, is spaced from the platform surface by a first distance when the variable vane is in the first position;
the airfoil, at a location chordwise within the recess, is spaced from the platform surface by a second distance when the variable vane is in the first position; and
the second distance is greater than the first distance.

8. The apparatus of claim 1, wherein further comprising:
the platform extends circumferentially about a centerline;
the platform surface is adjacent the first end;
the platform surface, at a location upstream of the variable vane, having has a first radius to the centerline; and
the platform surface, at a location downstream of the variable vane, having has a second radius to the centerline that is less than the first radius.

9. The apparatus of claim 1, wherein the recess has a spanwise height that is less than twenty percent of a total span length of the airfoil.

10. The apparatus of claim 1, wherein the variable vane is configured to pivot about the pivot axis more than forty degrees.

11. The apparatus of claim 1, further comprising:
a compressor section;
the variable vane configured as an inlet guide vane for the compressor section.

12. The apparatus of claim 1, further comprising:
a plurality of vanes arranged circumferentially about a centerline;
the plurality of vanes comprising the variable vane; and
the pivot axis parallel with the centerline.

13. The apparatus of claim 1, further comprising:
a plurality of vanes arranged circumferentially about a centerline;
the plurality of vanes comprising the variable vane; and
the pivot axis angularly offset from the centerline by an acute angle.

14. The apparatus of claim 1, further comprising:
a plurality of vanes arranged circumferentially about a centerline;
the plurality of vanes comprising the variable vane; and
the pivot axis perpendicular to the centerline.

15. The apparatus of claim 1, wherein the first end, along the section of the airfoil, has a straight line geometry when viewed in a reference plane containing the pivot axis.

16. The apparatus of claim 1, further comprising:
a plurality of vanes arranged circumferentially about a centerline;
the plurality of vanes comprising the variable vane; and
a radius from the centerline to the first end, along the section of the airfoil, decreasing as the section of the airfoil extends towards the trailing edge.

17. An apparatus for a gas turbine engine, comprising:
a variable vane comprising a pivot axis and an airfoil, the variable vane configured to pivot about the pivot axis more than forty degrees between a first position and a second position;
the airfoil extending spanwise along a span line between a first end and a second end, the airfoil extending chordwise along a chord line between a leading edge and a trailing edge, the airfoil extending laterally between a first side and a second side, and a recess extending spanwise into the airfoil from the first end; and
a platform comprising a platform surface;
the airfoil spaced from the platform surface by a gap, the gap having a uniform height chordwise along a section of the airfoil chordwise adjacent the recess and between the recess and the leading edge, and the gap having a variable height chordwise along the recess.

18. The apparatus of claim 17, wherein the variable vane is configured to pivot about the pivot axis more than sixty degrees between the first position and the second position.

19. The apparatus of claim 17, further comprising:
an engine flowpath;
a protuberance projecting into the engine flowpath; and
a recess extending spanwise into the airfoil from the first end;
the airfoil, at the first end, spaced from the protuberance when the variable vane is in the first position; and
the airfoil, at the first end, aligned with the protuberance and the protuberance projecting into the recess when the variable vane is in the second position.

* * * * *